2,967,088

EXTRACTION TECHNIQUES FOR THE SEPARATION AND PURIFICATION OF METALS

Kurt Peters, Getreidemarkt 9, Vienna VI, Austria

No Drawing. Filed Apr. 23, 1957, Ser. No. 654,444

Claims priority, application Austria Apr. 26, 1956

9 Claims. (Cl. 23—14.5)

This invention relates to a process for purifying transition metals having substantially similar chemical and physical properties.

The purification of a mixture of metals or of metallic compounds is seriously complicated when the components of the mixture have substantially similar chemical and physical properties. Physical or chemical treatments of the mixture generally affect each of the components to about the same degree with the result that only a very minor purification is obtained. This problem is quite serious in the preparation and purification of the transition heavy metals of the periodic table (Periodic Table, Handbook of Chemistry and Physics, Chemical Rubber Publishing Company, 31st edition, page 336) and particularly in the preparation of the rare earth and transuranium metals. For example, the separation of substantially pure neodymium from a mixture of cerite earths by fractional crystallization requires several hundred crystallization steps. Fractional extraction by the methods presently known to the art also requires many repetitious operations before a pure product is obtained. Other methods which have been employed such as fractional sublimation of rare earth metal chlorides, fractional adsorption, separation by effecting the migration of ions in aqueous solution by application of an electric field, separation in a magnetic field, ion exchange with base exchangers, and selective solvation, all require a multistage procedure since only a fractional concentration is achieved in each step. Further, in many cases pure fractions are obtainable only in low yields. As a result of the high cost of purifying these metals, their use is not economically feasible for many purposes.

It is an object of this invention to provide a process for purifying transition heavy metals which have substantially similar chemical and physical properties.

It is a further object to provide a process for separating and/or purifying transuranium metals in pure form.

Still another object of the invention is to provide a process for separating and/or purifying the rare earth metals in pure form.

Other objects will be apparent from the disclosure and the appended claims.

The objects are achieved by extracting water-insoluble salts of polybasic organic acids of the metals to be separated with solutions of water-soluble aluminum salts. The water-insoluble salts are soluble in the aqueous extracting solution of the aluminum salts, forming complex ions therein. However, since the water-insoluble salts are not soluble to the same degree in the extracting solution, the most soluble of the metal salts will be preferentially dissolved in the extracting solution with a corresponding enrichment of the solid residue in the least soluble of the metal salts.

The preferred insoluble salts of the metals to be separated according to the process of the present invention are the citrates, tartrates, and particularly the oxalates. The invention will be hereinafter described in terms of the process employing as starting materials the oxalates of the metals to be separated.

The metals to be separated are first converted to oxalates by standard techniques. These oxalates are then contacted with an aqueous solution of an aluminum salt such as potassium or ammonium alum, aluminum nitrate, aluminum citrate or aluminum oxalic acid.

The contacting may be advantageously carried out in an extracting column. However, it is also possible to operate batchwise by contacting the extracting solution and the water-insoluble metal oxalates in vessels with vigorous stirring.

The process may be employed at a maximum rate with a minimum of equipment and apparatus by observing the following techniques. The oxalates of the metals being separated should be used in a highly active form, for example, by freshly precipitating it before charging it into the extraction system. The precipitate should be employed in a highly dispersed form, for example, as a fine suspension in a solution. Throughout the extraction there should be a brisk exchange of material between the surface of the oxalates and the extracting solution. This may be accomplished by providing vigorous forced convection, for example, by mechanical mixing with conventional stirring devices.

An example where the use of freshly prepared oxalates is particularly beneficial to the process of the present invention is provided by the separation of the yttrium earth metals, particularly scandium and yttrium.

The extraction is preferably carried out slowly in a stepwise manner. Changes in the environmental conditions, and in particular, concentration, pH and temperature, are such that the conditions are as close to the optimum extraction conditions as possible. The preferred extracting temperature is 70° C. The preferred rate of contact between the extracting solution and the oxalate in an extracting column is 1 to 3 cubic meters per day per cubic meter of oxalate.

In order to still more effectively separate the metal values, the aluminum-containing extracting solution most advantageously contains the aluminum as a complex ion of a polybasic organic acid, and particularly as aluminum oxalato complex ions, aluminum citrato complex ions, and aluminum tartrato complex ions. This extracting solution may be made up by dissolving aluminum salts of the polybasic organic acids in water, as for example, aluminum oxalic acid, aluminum citric acid, or aluminum tartaric acid. The difference in solubilities of the oxalates is most efficiently utilized by this technique.

In an example of the invention, a mixture of chlorides of the rare earths, obtained by the alkaline decomposition of monazite sand with subsequent removal of sodium phosphate, thorium, and cerium by leaching the reduced product with hydrochloric acid, was treated with oxalic acid, thereby precipitating the rare earth metals as oxalates. The oxalates were filtered, washed with water, and transferred to an extraction column. A one percent aqueous solution of potassium aluminum sulfate was trickled slowly through the oxalates at a temperature of 70° C. The extract was removed from the lower end of the column through a siphon seal. The rare earth metals were obtained in the extract fractions in the order in which they appear in the periodic table. The first extract contained predominantly lanthanum, the following extracts containing first praseodymium, then praseodymium and neodymium, followed by neodymium, and still later extracts containing samarium, and the remaining rare earth metals.

In a second example of the invention, a solution containing nickel and cobalt sulfate in a combined concentration of about 10 percent was treated with oxalic acid at a pH value of 3 so as to precipitate the oxalates of nickel and cobalt. After the precipitate was washed free of sulfuric acid, it was digested with vigorous stirring with 5 percent ammonium alum, about 10 liters of alum solution being employed for each kilogram of oxalate. The procedure was repeated several times until the cobalt was completely extracted. The residue consisted of nickel oxalate of very high purity exempt of cobalt.

While the invention has been described in terms of the oxalates, the invention is not so limited.

Examples of other separations which can be effected by the process of the present invention are: zirconium and hafnium; molybdenum and tungsten; the platinum metals; the actinides; and the transuranium metals.

The invention can also be carried out with a metal salt solution containing another metal than aluminum. The metal salt solutions which may be used are those which yield soluble complexes with the compounds of the metals it is desired to separate. Examples of such salts are those of boron, scandium, zirconium, vanadium, niobium, tantalum, antimony, chromium, uranium and iron. Also complex salts e.g. the complexes of chromium, molybdenum or tungsten with oxalic acid may be used.

The extraction which is usually carried out in an aqueous medium can also be performed when using for the extraction solution an organic solvent as methyl or ethyl alcohol or their mixtures with water.

What is claimed is:

1. A process for separating mixtures of metals selected from the group consisting of nickel, cobalt, zirconium, hafnium, molybdenum, tungsten and the rare earth and platinum metals which comprises converting the metal values to insoluble salts of a polybasic organic acid selected from the group consisting of oxalic acid, citric acid and tartaric acid and fractionally extracting said insoluble salts with an aqueous solution of a water-soluble aluminum salt, whereby the metal values appear in the fractions in the order of their atomic number in the periodic table.

2. A process in accordance with claim 1 wherein the extraction is effected at a temperature of about 70° C.

3. A process in accordance with claim 1 wherein the aluminum salt employed in the extracting solution is selected from the group consisting of aluminum oxalic acid, aluminum citric acid and aluminum tartaric acid.

4. A process for separating mixtures of metals selected from the group consisting of nickel, cobalt, zirconium, hafnium, molybdenum, tungsten and the rare earth and platinum metals which comprises converting the metal values to oxalates; introducing said oxalates into an extracting zone, passing an aqueous solution of an aluminum salt selected from the group consisting of aluminum oxalic acid, aluminum citric acid and aluminum tartaric acid through said oxalates at a rate in the range of from 1 to 3 cubic meters per day per cubic meters of oxalate and removing the extract from said extracting zone in fractions, the metal values appearing in said extract fractions in the order of their atomic number in the periodic table.

5. A process in accordance with claim 4 wherein the temperature is maintained at about 70° C. throughout the extraction.

6. A process for the separation and recovery of rare earth metals from monazite sand from which thorium and cerium have been removed which comprises converting the rare earth metals remaining in said monazite sand to oxalates and fractionally extracting said rare earth metal oxalates with an aqueous solution of a water-soluble aluminum salt whereby the rare earth metal values appear in the extract fractions in the order of their atomic number in the periodic table.

7. A process in accordance with claim 6 wherein the extraction is effected at a temperature of 70° C.

8. A process for the recovery of nickel and cobalt values from an aqueous solution thereof and for the simultaneous separation of these metals from each other which comprises precipitating said nickel and cobalt values from said aqueous solution as oxalates and fractionally extracting the cobalt from the cobalt and nickel oxalate precipitate by treating said precipitate with an aqueous solution of a water-soluble aluminum salt until substantially all the cobalt is extracted to leave nickel oxalate substantially free of cobalt contamination.

9. A process in accordance with claim 8 wherein the temperature is maintained at about 70° C. throughout the extraction.

References Cited in the file of this patent

UNITED STATES PATENTS 2,741,628     Plucknett              Apr. 10, 1956

OTHER REFERENCES

Pimentel et al.: AECD–2323, Sept. 8, 1945 (date declassified Sept. 15, 1958), 10 pages. Copy available from Technical Library, U.S. Atomic Energy Commission, Germantown, Md. (Copy in TID–5290, pages 168–172 in Div. 46.)

Hodgman: Handbook of Chemistry and Physics, 31st ed. (1949), pages 336, 394–549.

Rodden: "Analytical Chemistry of the Manhattan Project" (1950), page 6, McGraw-Hill Book Co., Inc., New York.